United States Patent [19]

Tegtmeier

[11] Patent Number: 4,671,234
[45] Date of Patent: Jun. 9, 1987

[54] INJECTION SYSTEM OF AN INTERNAL COMBUSTION ENGINE

[75] Inventor: Dietrich Tegtmeier, Minden-Häverstädt, Fed. Rep. of Germany

[73] Assignee: Daimler-Benz Aktiengesellschaft, Fed. Rep. of Germany

[21] Appl. No.: 838,795

[22] Filed: Mar. 12, 1986

[51] Int. Cl.⁴ .............................................. F02B 15/00
[52] U.S. Cl. .................................... 123/432; 123/308; 123/585; 123/445
[58] Field of Search ................. 123/308, 432, 585, 445

[56] References Cited

U.S. PATENT DOCUMENTS 4,313,410  2/1982  Kunii et al. .......................... 123/432
4,614,174  9/1986  Taniyawa et al. ................... 123/432

Primary Examiner—E. Rollins Cross
Attorney, Agent, or Firm—Barnes & Thornburg

[57] ABSTRACT

An injection system for an internal-combustion engine has a plurality of separate inlet ports provided for each cylinder of the engine, and an intake pipe encompassing the inlet ports for each cylinder. The intake pipe has a subdividing web wall in the region of the cylinder head having a mixing chamber into which fuel is injected by an injection nozzle. The subdividing web wall subdivides the intake pipe into separate intake pipe sections and includes shot channels for communicating fuel from the mixing chamber to each of the separate intake pipe sections. By this arrangement, a constant, thorough mixing of the fuel/air mixture is achieved even at lower load and upper speed ranges of the engine.

11 Claims, 3 Drawing Figures

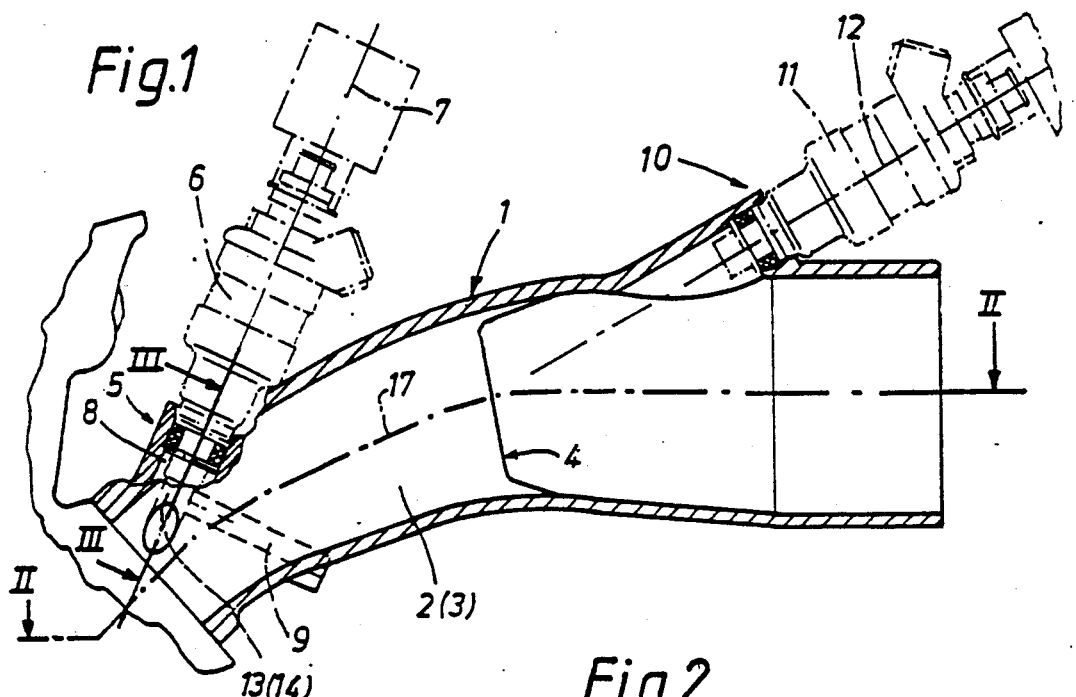
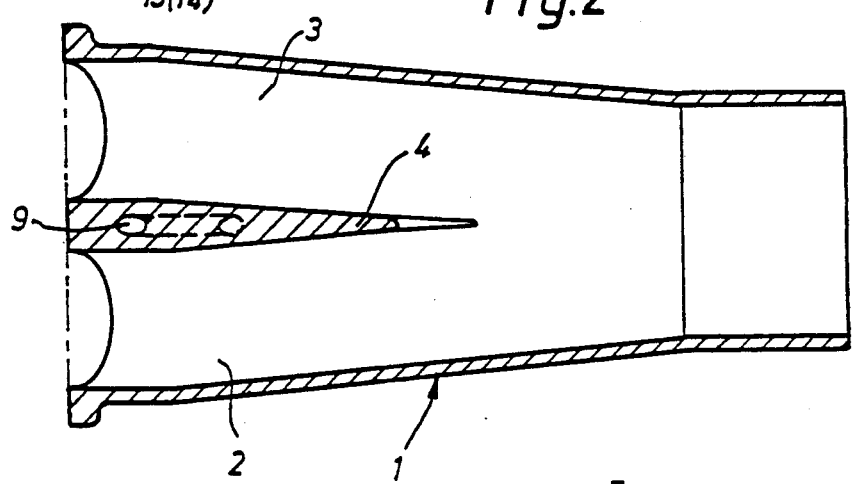
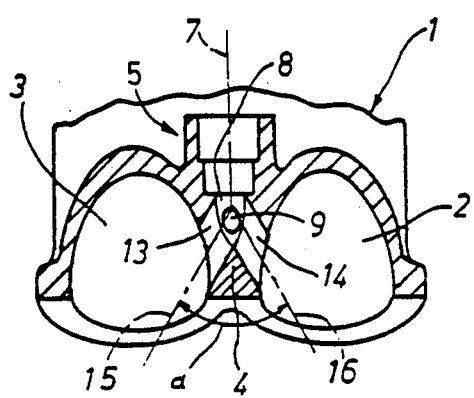

INJECTION SYSTEM OF AN INTERNAL COMBUSTION ENGINE

BACKGROUND AND SUMMARY OF THE INVENTION

The invention relates to an apparatus for injection system for an internal-combustion engine which has a plurality of separate inlet ports for each cylinder of the engine. An intake pipe for each cylinder encompasses these inlet ports, and a downstream injection nozzle injects fuel into the intake pipe.

In German Published Unexamined Patent Application (DOS) No. 2,414,022, a fuel supply system for an applied-ignition internal-combustion engine is shown which has two gas inlet valves per cylinder. Single intake pipes, each having a fuel valve, lead from the intake pipe of the internal-combustion engine, to the gas inlet valves. In this arrangement, each cylinder has a first gas inlet valve assigned to the main combustion chamber and a second gas inlet valve assigned to a secondary combustion chamber. The two combustion chambers are connected by a flame port. Inside the secondary chamber is a spark plug, by which the constantly rich fuel/air mixture is ignited. The flame front directed through the flame port from the secondary combustion chamber to the main combustion chamber is used to ignite the fuel/air mixture there. The fuel/air mixture is adapted to the changing operating conditions of the internal-combustion engine.

A disadvantage of the above arrangement is that in the upper engine load and lower speed ranges, the fuel/air mixture is not mixed thoroughly enough. This is due to the low velocity of the intake air flow and the remote positioning of the fuel valve from the gas exchange valve. The poor fuel/air mixing causes speed variations and unsatisfactory emissions.

An injection system is described in the German language periodical "technik mot" 11/1984 titled "Kopfarbeit", in which two separate inlet ports are provided for each cylinder. The two inlet ports are combined in a single intake pipe for each cylinder. A web wall in the region of the cylinder head in the single intake pipe subdivides the single intake pipe into two separate intake pipe sections. An injection nozzle is located upstream of the web wall in the single intake pipe. The internal-combustion engine with this injection system does not exhibit satisfactory response behavior in non-steady-state operation and subsequent exhaust treatment is hampered.

In British Patent Specification No. 1,351,771, an intake system for an internal-combustion engine is shown which includes a manifold intake pipe from which single intake pipes lead to the inlet valves of the cylinder. Fuel injection nozzles are located upstream of the gas exchanging valves in the single intake pipes. Inside the manifold intake pipe is a multi-hole fuel nozzle for supplying fuel during idling.

The disadvantages of the above system are the poor response behavior of the internal-combustion engine to load cycles, and poor running in the lower speed range. These are attributable to the remote arrangement of the multi-hole fuel nozzle from the gas exchange valve in the manifold intake pipe. During idling, the air speed in the manifold intake pipe is too low to generate adequate turbulences for mixing the fuel/air mixture in the combustion chamber.

An object of the invention is to ensure a constant, thorough mixing of the fuel/air mixture in the intake pipe even at the lower load and upper speed ranges of the internal-combustion engine.

This and other objects are attained by the present invention by providing in an intake pipe of an injection system a subdividing means in the region of the cylinder head for subdividing the intake pipe into separate intake pipe sections. The subdividing means has a mixing chamber into which fuel is injected by at least one injection nozzle. The subdividing means also has shot channels for communicating fuel from mixing chamber to each of the separate intake pipe sections.

An advantageous feature of preferred embodiments of the present invention is an idle air port in the subdividing means which supplies air to the mixing chamber. In the air port, the intake air reaches a high speed, such that a good, thorough mixing of the fuel/air mixture in the cylinder is ensured and the emission during idling is reduced. Due to the intense flow of intake air around the fuel injection nozzle, no fuel residues are left behind on the fuel injection nozzle or in the mixing chamber. The fuel/air mixture for idling operation is therefore homogenous. This stabilizes the idling speed, allowing it to be adjusted to a low speed.

A feature of preferred embodiments of the present invention is the second fuel injection nozzle which is upstream of the subdividing means This nozzle can be switched on when the engine is operating at full load, to inject more fuel to the cylinder when it is needed.

Further objects, features and advantages of the present invention will become apparent from the following description when taken with the accompanying drawings, which show for purpose of illustration only, an embodiment constructed in accordance with the present invention.

BRIEF DESCRIPTION OF THE DRAWINGS

FIG. 1 is a sectional view of an intake pipe constructed in accordance with a preferred embodiment of the present invention;

FIG. 2 is a partial sectional view of the embodiment of FIG. 1 taken along line II—II of FIG. 1; and FIG. 3 is a partial cross-sectional view of the embodiment of FIG. 1 taken along line III—III of FIG. 1.

DETAILED DESCRIPTION OF THE DRAWINGS

With reference to FIG. 1, a single intake pipe of an injection system is denoted by the reference numeral 1. The intake system, not illustrated in detail, is part of an internal-combustion engine having four gas exchange valves per cylinder. The single intake pipe is attached at the cylinder head and is a continuation of the gas exchange ports.

Upstream from the mouth of the single intake pipe 1, in the direction of the axial extension of the single intake pipe 1, is a web wall 4, which subdivides the single intake pipe 1 into left-hand and right-hand single intake pipe regions 2, 3. The web wall 4 extends in the axial direction to approximately the center of the single intake pipe 1. In the web wall 4, in the vicinity of the mouth of the single intake pipe 1, is a reception area 5 for a schematically illustrated first fuel injection nozzle 6. The center longitudinal axis 7 of the first fuel injection nozzle 6 is aligned in the direction of the gas exchanging valve, not shown.

Shot channels 13, 14 are provided in the web wall 4, which connect the left-hand and right-hand regions 2, 3 of the single intake pipe 1 to a mixing chamber 8. The intersection of the shot channels 13, 14 form the mixing chamber 8 ahead of the first fuel nozzle 6. The shot channels 13, 14 open out into the intake pipe sections 2, 3 directly in the region of the joint between the cylinder head and the single intake pipe 1 near the mid-longitudinal axis 17.

An idle air port 9 led through the web wall 4 opens out into the mixing chamber 8. The idle air port 9 penetrates the wall of the single intake pipe 1 on the side of the single intake pipe 1 opposite the fuel injection nozzle 6. The idle air port 9 is dimensioned such that, in an internal-combustion engine with a power of 136 kW and a cubic capacity of 2299 $cm^3$, the air flow reaches a speed of about 120 m/s, so that a mass flow of about 14 kg/h is achievable.

Provided upstream of the web wall 4 is a receptacle 10 for a second fuel injection nozzle 11, shown in phantom, which operates during full-load operation. Like the first fuel injection nozzle 6, the mid-longitudinal axis 12 of the second fuel injection nozzle 11 points in the direction of the gas exchange valve, not shown.

FIG. 2 clearly illustrates the subdivision by the web wall 4 of the single intake pipe 1 into left-hand and right-hand single intake pipe regions 2, 3. The idle air port 9, shown in phantom in this figure, penetrates the bounding wall of the single intake pipe 1 on the opposite side of the fuel injection nozzle 6.

The reception region 5 of the first fuel injection nozzle 6 is illustrated in FIG. 3. The single intake pipe 1 is subdivided by the web wall 4 into the left-hand and right-hand single intake pipe regions 2, 3. The shot channels 13, 14 have an identical cross-sectional area and connect the left-hand and right-hand single intake pipe regions 2, 3 to the fuel injection nozzle 6. This connection forms, upstream of the fuel injection nozzle 6, a mixing chamber 8 into which the idle air port 9 also opens out. The axes 15, 16 of the shot ports 13, 14 intersect the central longitudinal axis 7, and are arranged at an acute angle with respect to each other. The central longitudinal axis 7 lies in the plane of the acute angle formed by the axes of the shot channels 13, 14. This acute angle of taper $\alpha$ is equal to or less than the angle of taper assumed by the fuel when emerging from the fuel injection nozzle 6.

In a contemplated embodiment of the invention which is not illustrated, the idle air port is arranged in the region of the fuel injection nozzle such that the fuel injection nozzle faces the intake air flow.

Although the present invention has been described and illustrated in detail, it is to be clearly understood that the same is by way of illustration and example only, and is not to be taken by way of limitation. The spirit and scope of the present invention are to be limited only by the terms of the appended claims.

I claim:

1. Apparatus for an injection system for an internal-combustion engine with a plurality of separate inlet ports provided for each cylinder of the engine, intake pipe means encompassing said plurality of inlet ports, and at least one downstream injection nozzle in said intake pipe means said intake pipe arrangement comprising:
   subdividing means in the region of a cylinder head, for subdividing said intake pipe means into separate intake pipe sections;
   said subdividing means having a mixing chamber into which fuel is injected by said at least one downstream injection nozzle means, and
   shot channel means for communicating fuel from said mixing chamber to each of said separate intake pipe sections.

2. The apparatus of claim 1, wherein said fuel is injected into said mixing chamber when said engine is idling and operating at a partial load.

3. The apparatus of claim 1, further comprising at least one upstream injection nozzle means disposed upstream of said subdividing means.

4. The apparatus of claim 3, wherein said upstream injection nozzle means injects fuel into said intake pipe means when said engine is operating at an upper partial load and at full load.

5. The apparatus of claim 3, further comprising at least one downstream injection nozzle means for injecting fuel into said mixing chamber.

6. The apparatus of claim 1, further comprising an idle air port means for communicating air to said mixing chamber.

7. The apparatus of claim 6, wherein said idle air port means is a bore through said subdividing means, with openings at said mixing chamber and an underside of said intake pipe means.

8. The apparatus of claim 1, wherein said subdividing means is a web wall.

9. The apparatus of claim 1, wherein a central longitudinal axis of one said shot channel means forms an acute angle $\alpha$ with a central longitudinal axis of another said shot channel means.

10. The apparatus of claim 9, wherein a central longitudinal axis of said at least one downstream injection nozzle lies in a plane formed by said acute angle $\alpha$.

11. The apparatus of claim 1, further comprising at least one downstream injection nozzle means for injecting fuel into said mixing chamber.

* * * * *